(12) United States Patent
Böwing et al.

(10) Patent No.: US 11,556,353 B2
(45) Date of Patent: Jan. 17, 2023

(54) SELECTIVE ENHANCEMENT OF INTERACTIVE CONFIGURATION INTERFACES

(71) Applicant: International Business Machines Corporation, Armonk, NY (US)

(72) Inventors: Norman Christopher Böwing, Boeblingen (DE); Qais Noorshams, Boeblingen (DE); Pradeep Parameshwaran, Boeblingen (DE); Marco Selig, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 848 days.

(21) Appl. No.: 16/449,780

(22) Filed: Jun. 24, 2019

(65) Prior Publication Data

US 2020/0401909 A1 Dec. 24, 2020

(51) Int. Cl.
*G06F 9/445* (2018.01)
*G06K 9/62* (2022.01)

(52) U.S. Cl.
CPC ....... *G06F 9/44505* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 7,043,539 B1* | 5/2006 | Treiber | H04L 41/082 |
| | | | 711/170 |
| 7,287,027 B2 | 10/2007 | Klein | |
| 8,825,649 B2 | 9/2014 | Heimendinger et al. | |
| 8,843,423 B2 | 9/2014 | Chu et al. | |
| 8,954,880 B1 | 2/2015 | Rabe et al. | |
| 9,772,871 B2 | 9/2017 | Razin | |
| 2003/0038842 A1* | 2/2003 | Peck | G06F 11/263 |
| | | | 715/763 |
| 2007/0027972 A1* | 2/2007 | Agrawal | H04L 67/34 |
| | | | 709/223 |

(Continued)

FOREIGN PATENT DOCUMENTS

EP 2985662 A1 2/2016

OTHER PUBLICATIONS

"Predictive Performance Modeling of Virtualized Storage Systems using Optimized Statistical Regression Techniques", ICPE '13 Proceedings of the 4th ACM/SPEC International Conference on Performance Engineering, Prague, Czech Republic, 2013, 12 pages.

*Primary Examiner* — Qing Chen
(74) *Attorney, Agent, or Firm* — Eric Chesley

(57) ABSTRACT

A method for selectively generating suggested default values for I/O configurations is provided. The method identifies a first selection including a first input value for an I/O configuration. The method determines a set of remaining input options based on the first selection. The method accesses a set of decision trees based on the set of remaining input options and selects a decision tree of the set of decision trees based on the first input value. The method generates a suggested value for a subsequent selection for the I/O configuration and causes presentation of the suggested value and a user interface element representing the subsequent selection.

20 Claims, 7 Drawing Sheets

(56) References Cited

U.S. PATENT DOCUMENTS

| | | | |
|---|---|---|---|
| 2012/0239374 A1* | 9/2012 | Mutyalapati | G05B 19/0423 |
| | | | 703/21 |
| 2013/0339497 A1* | 12/2013 | Mohamed | H04L 41/0809 |
| | | | 709/221 |
| 2017/0004007 A1 | 1/2017 | Kousaka et al. | |
| 2017/0286169 A1 | 10/2017 | Ravindran et al. | |
| 2020/0374196 A1* | 11/2020 | Powell | H04L 41/0843 |

* cited by examiner

SELECTIVE ENHANCEMENT OF INTERACTIVE CONFIGURATION INTERFACES

BACKGROUND

The present disclosure relates generally to methods for configuration interactions, but not exclusively, to a computer-implemented method for selectively enhancing interactive configuration interfaces using dynamically generated default values.

Some systems enable users to engage in I/O device configuration. Users of such systems manually edit subchannel set identifications for each device or device group. Users also manually edit subchannel set identifications individually through structured dialogues. Some configuration systems generate user interfaces with user-customized default values for I/O device configuration. Default values may be chosen based on usage of a value above a defined threshold. Some systems enable entering of default field values through statistical defaulting for I/O device configuration. Some systems use pre-selection of layout elements for data visualization in I/O device configuration. Some systems use missing value imputation to gather relevant data from multiple sources to build imputation models to predict missing variables.

SUMMARY

According to an embodiment described herein, a computer-implemented method for selectively generating suggested default values for I/O configurations is provided. The method identifies a first selection including a first input value for an I/O configuration. The method determines a set of remaining input options based on the first selection. The method accesses a set of decision trees based on the set of remaining input options and selects a decision tree of the set of decision trees based on the first input value. The method generates a suggested value for a subsequent selection for the I/O configuration and causes presentation of the suggested value and a user interface element representing the subsequent selection.

Some embodiments of the inventive concepts described herein may take the form of a system or a computer program product. A computer program product may store program instructions that, when executed by one or more processors of a computing system, cause the computing system to perform operations described above with respect to the computer implemented method. The system may comprise components, such as processors and computer readable storage media. The computer readable storage media may interact with other components of the system to cause the system to execute program instructions comprising operations of the computer implemented method, described herein.

DETAILED DESCRIPTION

Figure 1:
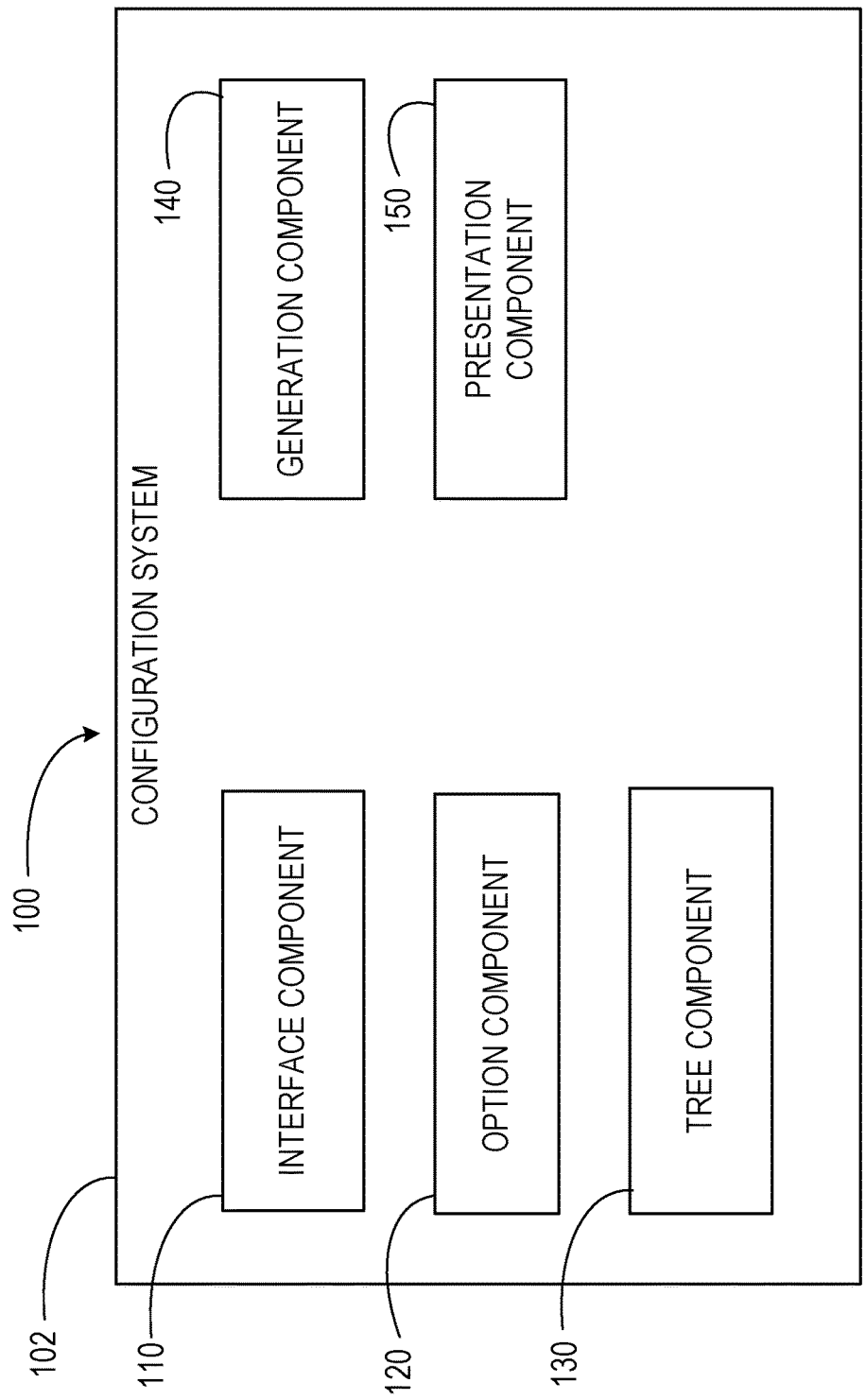
FIG. 1 depicts a block diagram of a computing environment for implementing concepts and computer-based methods, according to at least one embodiment.

The present disclosure relates generally to methods for configuration interactions, but not exclusively, to a computer-implemented method for selectively enhancing interactive configuration interfaces using dynamically generated default values.

Hardware configuration definitions (HCD) may define and activate input/output (I/O) configurations for servers and operating systems. HCD may be used in operating system environments to define elements such as I/O devices from storage systems and connect the I/O device elements to partitions and operating systems for use over a series of other I/O elements. Users of the HCD may have differing naming conventions, diverging from defined HCD values. Such user-based divergence may interrupt workflow. Defining a new device using HCD may employ entering input of a device number, a count/range, a type, and a control unit (CU) identification. The CU may include additional parameters or characteristics. Connecting a new device may employ input of a subchannel set for which a default may be suggested.

Subchannel set identifications (SSID) may be associated with arbitrary logical values. Where servers support SSIDs, the default SSID may be set at a predetermined value, such as zero, unless a device supports non-zero SSIDs. In such instances, the SSID of the device may be set at one. SSIDs are specified for devices or groups of devices individually. Where default values do not satisfy a user's convention, the SSID default value is changed for every device during definition of the I/O configuration.

Real life hardware configuration can become complex. One reason may be redundancy that is implemented by means of specifying multiple paths (e.g., from one operation system to a storage device in the network) such that availability of resources can be ensured in the event of a single or multiple hardware failure/s occur along this path (e.g., in network cards or switches). Another reason are customer conventions to ease operations. Hardware configuration systems, such as HCD, validate configurations a user inputs such that only valid hardware configurations can be created in the first place (e.g., only a single cable connection can be assigned to a physical port). A user of such a system might be subject to additional, weaker constraints or conventions that ensure a manageable operability (e.g., assigning only certain ranges of device IDs to certain operating systems). Any violation of such conventions will lead to hardware-wise valid but operationally undesired configurations that could even pose a security violation (e.g., exposure of private storage devices to some or all members of a multi-tenant environment).

Due to considerations of the HCD and SSID, embodiments of the present disclosure enhance interactive configuration dialogues with user-specific default values based on decision trees learning from existing configurations. The interactive configuration dialogue may be enhanced by automatically suggesting user-specific default configuration inputs based on the decision trees. The decision trees may be generated and trained based on existing configuration user data. Some systems lack context awareness to other input values aside from the default values or combinations of default values given in sequence. Embodiments of the present disclosure may enable context aware I/O configuration. Some embodiments of the present disclosure provide such context awareness without use of fixed thresholds. Some embodiments of the present disclosure generate default values for an input dependent on a single field from which the default value depends.

Embodiments of the present disclosure suggest configuration parameters to a user who defines hardware configuration changes. Suggestions may be derived from a currently active hardware configuration without use of static set rules. The suggested configuration parameters may obey suitable conventions incorporated into an active hardware configuration. Such embodiments may lessen the risk of accidentally defining valid but unconventionally or undesirable configurations. Further, suggested configuration parameters of a hardware configuration object may take into account previously defined configuration parameters. The suggested parameters may be original in that suggestions for new configurations may be provided, and suggestions may not be limited to combinations of configuration parameters that have been defined in the past. In some embodiments, users may be provided with suggestions as the user progresses through the hardware configuration user interface. This may permit the user to overwrite suggestions by manual input or to define multiple configuration objects more rapidly. Further, embodiments of the present disclosure may use decision trees which incorporate a user's convention of SSID defaults for device connections. SSIDs may be suggested for any device or group of devices, whereby configuration parameters of the device or group of devices which were already provided are taken into account. Manual input of an SSID may also be possible.

Embodiments of the present disclosure provide methods, systems, and program products which enhance interactive configuration dialogue with user-specific default values based on decision trees learning from existing configurations. The present disclosure may define an interactive workflow where all inputs are provided in a specified order. The specified order may be of variable length. In some embodiments, the present disclosure defines an interactive workflow where inputs are provided with a dynamic or variable order and variable length to the order. The present disclosure may generate and train decision trees based on user data or user interactions. Given a sequence of inputs, embodiments of the present disclosure use decision trees to enable suggestion for a next or subsequent value. In some instances, the subsequent or next values are added in sequence such that a first input is given by a user. The decision tree for a second input generates a suggestion based on the first input. The decision tree for the third input generates a suggestion based on the first input and the second input. The present disclosure may continue in this manner for (N+1) inputs based on the N previous inputs.

Some embodiments of the inventive concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating or transporting the program for use, by, or in connection, with the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a configuration system 102. The configuration system 102 may comprise an interface component 110, an option component 120, a tree component 130, a generation component 140, and a presentation component 150. The interface component 110 may identify selections and input values for I/O configuration interface dialogues. The option component 120 determines remaining input options based on received selections and values. The tree component 130 accesses and generates decision trees, and selects decision trees based on input values. The generation component 140 generates suggested values for subsequent selection in the I/O configuration dialogue. The presentation component 150 generates and presents interfaces and user interface elements including suggested values and subsequent selections for a user. Although described with distinct components, it should be understood that, in at least some embodiments, components may be combined or divided, or additional components may be added, without departing from the scope of the present disclosure.

Figure 2:
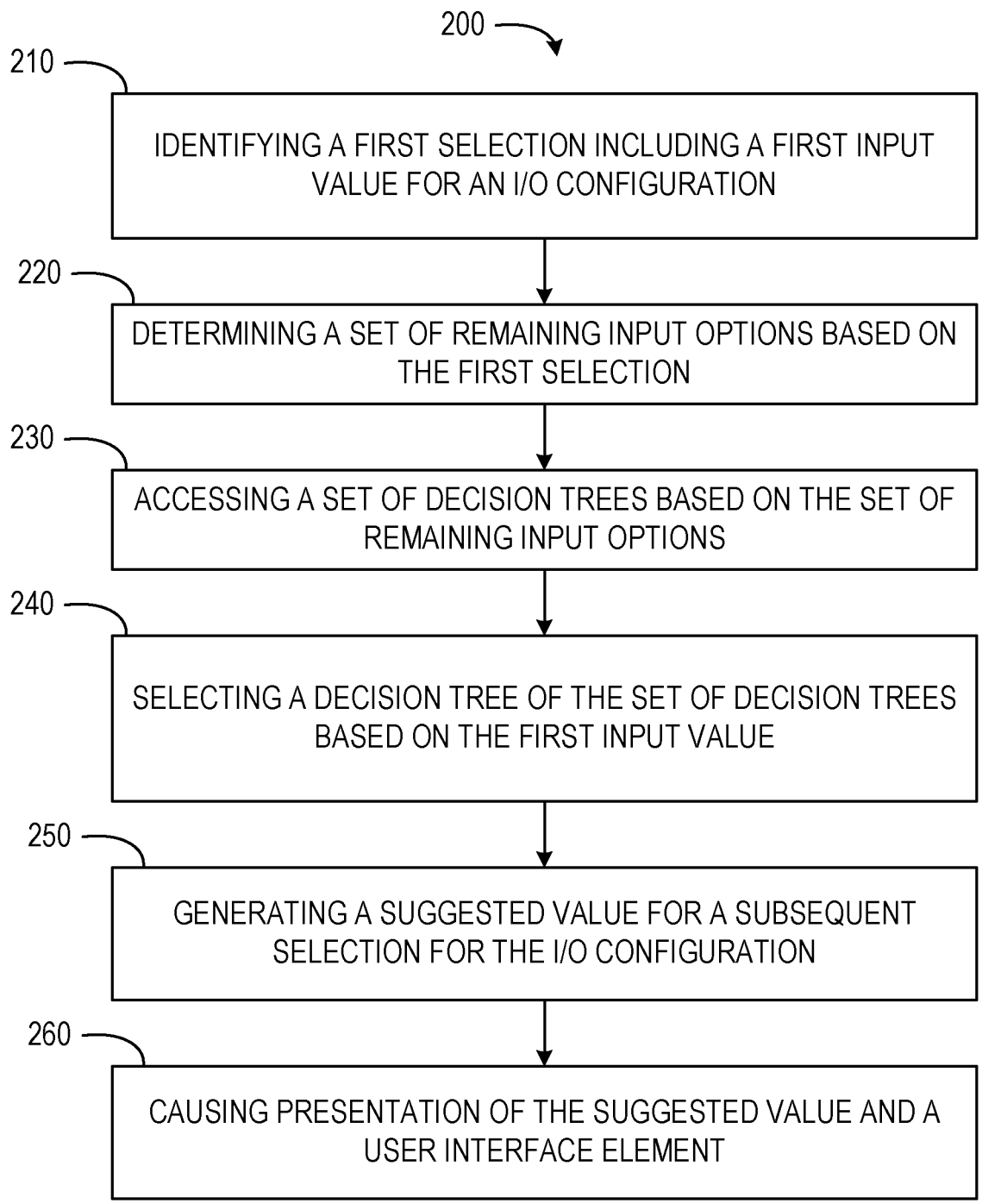
FIG. 2 depicts a flow diagram of a computer-implemented method for selectively enhancing interactive configuration interfaces, according to at least one embodiment.

Referring now to FIG. 2, a flow diagram of a computer-implemented method 200 is shown. The computer-implemented method 200 is a method for selectively enhancing interactive configuration interfaces. In some embodiments, the computer-implemented method 200 may be performed by one or more components of the computing environment 100, as described in more detail below.

At operation 210, the interface component 110 identifies a first selection including a first input value for an I/O configuration. The first selection may be provided by a user within a user interface. In some embodiments, the user initiates an I/O configuration application and enters an initial selection with an initial input value for at least one I/O device. The first selection and first input value may be entered in a text box, a command line prompt, or any other suitable data entry method.

In some embodiments, the interface component 110 validates the first input value. The interface component 110 may validate the first input value alone or may cooperate with one or more components of the configuration system 102 to validate the first input value. Upon identifying or otherwise receiving the first input value, the interface component 110 determines the first input value of the first selection is invalid. The interface component 110 may determine that the first input value is invalid by matching one or more of an expected value, a value range, or a data type associated with the first input value to known or approved characteristics or aspects of a valid input value. Where the interface component 110 fails to match a characteristic or aspect of the first input value with a known or expected characteristic or aspect, the interface component 110 determines the first input value to be invalid.

Where the interface component 110 determines the first input value is invalid, the presentation component 150 may cause presentation of a user interface element representing the first selection without the first input value. The interface component 110 may pass an invalidity indicator to the presentation component 150. Upon receiving the invalidity indicator, the presentation component 150 may generate, re-generate, refresh, or otherwise present the user interface again without the first input value provided by the user. In some embodiments, the presentation component 150 deletes or otherwise removes the first input value from the user interface with which the user interacted. The presentation component 150 may also generate instructions for the user to enter a new input value, a valid input value, or other suitable instruction. In some instances, the presentation component 150 generates and presents a new interface screen. The new interface screen may present user interface elements enabling entry of a new input value by the user. The new interface screen may also present an indicator instructing the user that the previous value was invalid, a manner or reason for which it was invalid, and an indication or instruction for providing a valid input value.

In some embodiments, the interface component 110 determines the first input value is valid. The interface component 110 may determine the first input value is valid by matching one or more aspect or characteristic of the first input value to a known, approved, or expected characteristic or aspect for a valid value. Where the interface component 110 matches the first input value, verifying the first input value is valid, the interface component 110 may pass a validity indicator to one or more components of the configuration system 102.

In response to determining the first input value is valid, the generation component 140 stores the first input value within the I/O configuration. The generation component 140 may store the first input value within a database associated with the I/O configuration, within metadata, or within a temporary data structure. The generation component 140 may store the first input value to iteratively build the I/O configuration file, instruction, or data structure. The generation component 140 may also store the first input value such that the I/O configuration file, instruction, or data structure is not generated until a final input value is entered and validated.

At operation 220, the option component 120 determines a set of remaining input options based on the first selection. In some embodiments, the option component 120 determines the set of remaining input options based on a type or characteristic of the first selection. The set of remaining input options are a number and type of additional selections which may be presented to the user prior to completion of the I/O configuration. Types or characteristics of the first selection may include a device number, a number of devices, a device type, a device class, a device serial number, a device description, a volume serial number, a device usage, combinations thereof, or any other suitable aspect describing one or more of the device associated with the first selection or a system associated with the I/O configuration. The option component 120 may also determine the set of remaining input options based, at least in part, on the first input value or a type of the input value.

The set of remaining input options may be any number of options. In some instances, the option component 120 determines no additional input options remain and the method may terminate by generating the I/O configuration from the first selection and the first input value. The set of remaining input options may include a plurality of options or selections relating to a device associated with the first selection and the first input value. In such instances, at least a portion of the set of remaining input options may represent additional characteristics to be entered for the device associated with the first selection in order to complete the I/O configuration for that device or a system on which the device is to be used. The set of remaining input options may also include a plurality of options or selections for additional devices. The additional devices may be related to the device of the first selection (e.g., additional instances of the same device or peripheral devices which cooperate with the device of the first selection).

At operation 230, the tree component 130 accesses a set of decision trees based on the set of remaining input options. Each decision tree may be understood as a function on at least one input parameter. The decision trees may map to an initial value and enable prediction of a value of one or more additional parameters. Where each decision tree is a function, the decision trees may be understood as a function $f$ on an input parameter mapping to a default value N, such that $f(v_1, v_2, [\ldots], v_{n-1})$=default N. In embodiments where additional options remain, the option component 120 passes an indicator to the tree component 130. The indicator may trigger the tree component 130 to access the set of decision trees based on the set of remaining input options. The set of decision trees may be a predetermined set of decision trees, trained or otherwise generated based on a set of training data. The tree component 130 may access the set of decision trees stored within a tree database.

At operation 240, the tree component 130 selects a decision tree of the set of decision trees based on the first input value. The tree component 130 may select the decision tree by matching the first input value to a value or parameter associated with the decision tree. In such instances, a data structure containing the decision trees may store each decision tree and store values or parameters for which each tree is a function. Where the tree component 130 matches the first input value to a parameter for a specified decision tree, the tree component 130 may select that decision tree for use in the present method. The parameters associated with decision trees, or on which the decision trees are based, may be stored in metadata linked to the data structure containing the decision trees. The parameters may also be indicated within the decision tree associated with that parameter. The tree component 130 may access the parameters for matching regardless of placement or data structure.

At operation 250, the generation component 140 generates a suggested value for a subsequent selection for the I/O configuration. The generation component 140 may generate the suggested value by receiving the first input value as an input to the selected decision tree. The generation component 140 may iteratively determine subsequent values by inserting previously generated or provided values to the decision tree. In this way, each subsequent value is built upon previous values using the decision tree. In some embodiments, the generation component 140 generates the suggested value by determining a position of the first input value within the decision tree. The generation component 140 may determine a next value in the decision tree and select the next value in the decision tree as the suggested value.

At operation 260, the presentation component 150 causes presentation of the suggested value and a user interface element. The user interface element may represent the subsequent selection. In some embodiments, the presentation component 150 presents the suggested value by generating a user interface with which a user may progressively interact to generate the I/O configuration. The user interface may include an indication or representation of previously selected input values, the suggested value, and the interface element enabling entry or selection of a new input value. In some embodiments, the suggested value is populated into the user interface element, enabling the user to accept or override the suggested value. The suggested value may also be presented in a portion of the user interface outside of the user interface element with an instruction noting that the suggested value is a predicted value suitable for selection by the user.

In some embodiments, at least a portion of the operations of method 200 may be repeated or iterated a plurality of times. For example, portions of the method 200 may be repeated until no remaining input options or no remaining inputs in a set of remaining inputs are available. In such embodiments, the decision tree selected in operation 240 may be a first decision tree and the suggested value of operation 250 may be a first suggested value. The first suggested value may be a value suggested for a second selection for the I/O configuration.

After generating and presenting the first suggested value, the interface component 110 identifies a second input value. The second input value may indicate the second selection for the I/O configuration. The interface component may identify the second input value in a manner similar to or the same as described above with respect to operation 210. In response to or based on identifying the second input value, the option component 120 may determine a subset of remaining inputs from the set of remaining inputs discussed in operation 220. The tree component 130 may then access the set of decision trees based on the subset of remaining inputs. After accessing the set of decision trees, the tree component 130 may select a second decision tree of the set of decision trees based on the second input value, the first input value, and the subset of remaining inputs. Here, the tree component 130 iteratively selects decision trees after each successive suggestion and corresponding selection of input values until a final, terminal, or last option of the remaining inputs is reached.

After selection of the second decision tree, the generation component 140 generates a second suggested value for a third selection for the I/O configuration. The presentation component 150 may then cause presentation of the second suggested value and a user interface element representing the third selection.

Figure 3:
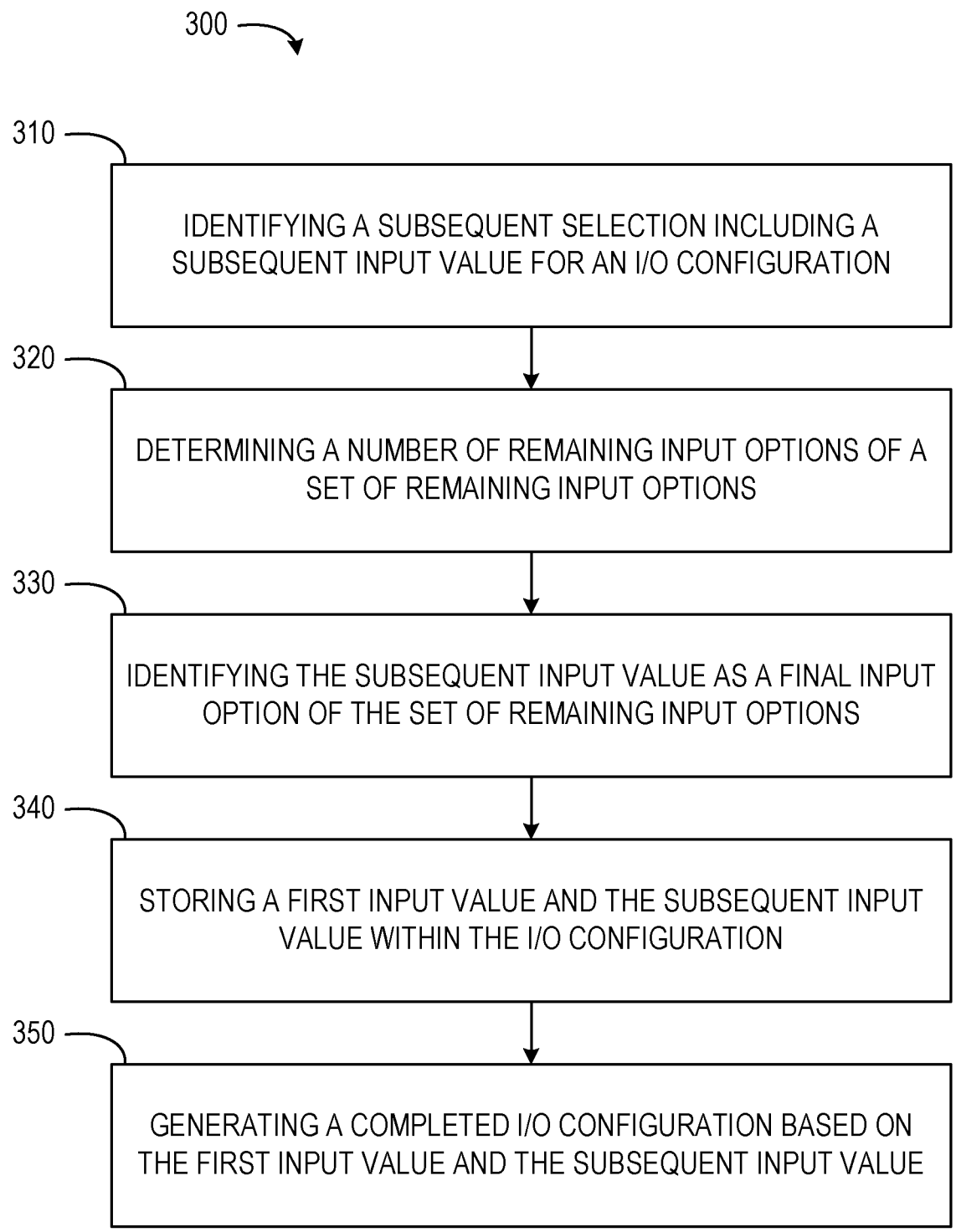
FIG. 3 depicts a flow diagram of a computer-implemented method for selectively enhancing interactive configuration interfaces, according to at least one embodiment.

FIG. 3 shows a flow diagram of an embodiment of a computer-implemented method 300 for selectively enhancing interactive configuration interfaces. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the interface component 110 identifies a subsequent selection including a subsequent input value for an I/O configuration. In some embodiments, the interface component 110 identifies the subsequent selection after initially identifying a first selection including a first input value as in operation 210. The subsequent selection may be identified after the first input value is entered by the first selection. The interface component 110 may identify the subsequent selection based on an entry time of a selection, occurring after the first selection. In some instances, the interface component 110 accesses a temporary data structure or the I/O configuration to determine if a previous selection occurred (e.g., the first selection). Where a previous selection occurred, the interface component 110 interprets the present selection as a subsequent selection. The interface component 110, alone or in combination with another component, may then store the subsequent input value into the temporary data structure or the I/O configuration at a position following any previous selections and input values.

In operation 320, the option component 120 determines a number of remaining input options of the set of remaining input options. In some instances, the option component 120 determines the number of remaining input options by decrementing a set of remaining input options determined after a previous selection. The option component 120 may determine the number of remaining input options in a manner similar to or the same as described above with respect to operation 220. In some instances, each time a subsequent selection is provided, the option component 120 determines the set of remaining input options or number of remaining input options without regard to previously determined input options or sets of input options.

In operation 330, the option component 120 identifies the subsequent input value as a final input option of the set of remaining input options. The final input option indicates no further selections or input values are needed to complete the I/O configuration for the user. In some embodiments, the option component 120 identifies the final input option by determining no remaining input options are available from the set of remaining input options. The option component 120 may also identify the final input option by maintaining a count of input options of the set of remaining input options and decrementing the count each time a new input is suggested or a subsequent selection is received.

In operation 340, the generation component 140 stores the first input value and the subsequent input value within the I/O configuration. Upon receiving each selection and each input value, the generation component 140 may store the input values within the I/O configuration. In this way, the generation component 140 iteratively builds the I/O configuration using each selection and input value.

In operation 350, the generation component 140 generates a completed I/O configuration based on the first input value and the subsequent input value. The generation component 140 may generate the completed I/O configuration by accessing the stored input values. The generation component 140 may then format or otherwise manipulate the input values to generate a completed I/O configuration. In some embodiments, the generation component 140 validates the I/O configuration by matching a number of input values received against the set of remaining input options which was previously determined. Where the number of input values is one greater than the set of remaining input options, the generation component 140 may determine the I/O configuration is validated and complete the I/O configuration.

Figure 4:
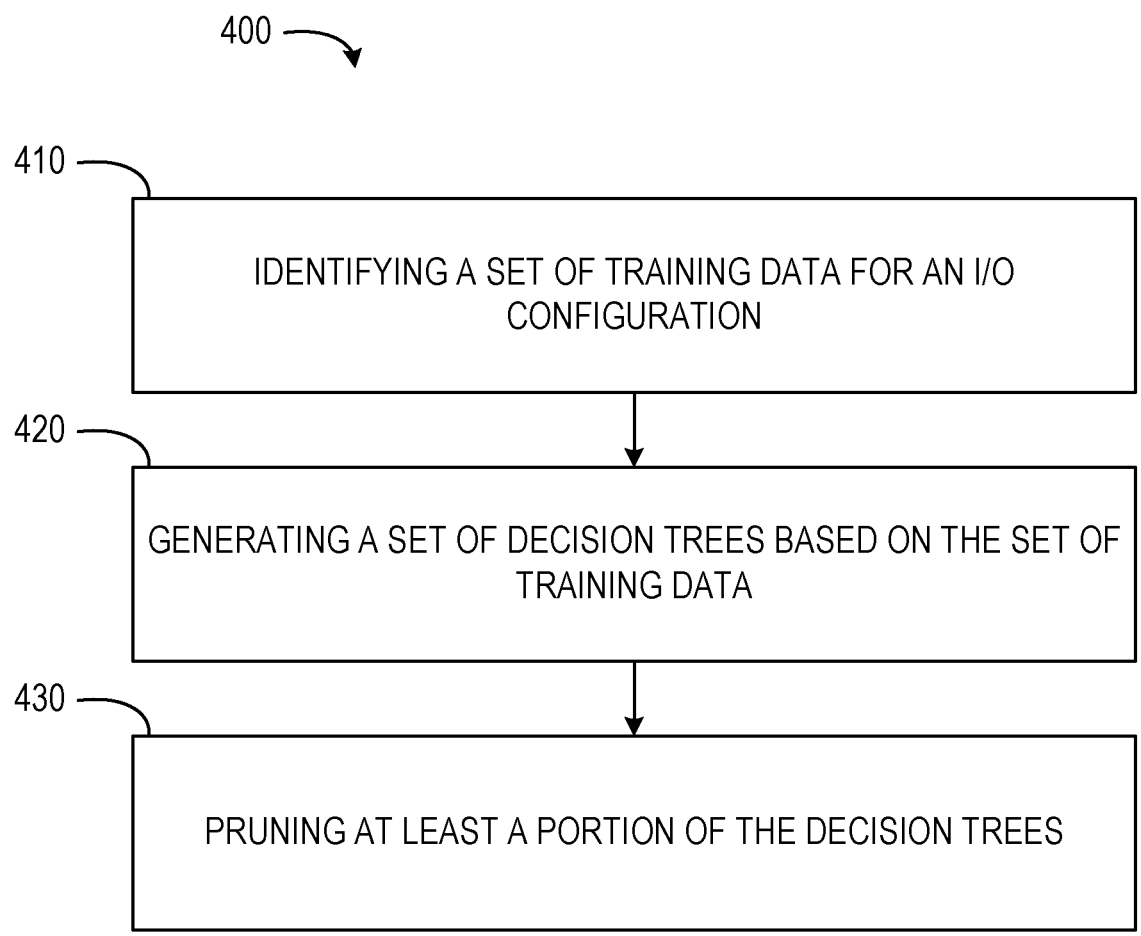
FIG. 4 depicts a flow diagram of a computer-implemented method for selectively enhancing interactive configuration interfaces, according to at least one embodiment.

FIG. 4 shows a flow diagram of an embodiment of a computer-implemented method 400 for selectively enhancing interactive configuration interfaces. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the generation component 140 identifies a set of training data. In some embodiments, the set of training data includes a plurality of input values for a plurality of inputs for an I/O configuration. The nature of each default value for I/O configuration may be discrete in general. In some embodiments, the set of training data includes default values defined by or selected by users during an 110 configuration interaction. All input parameter combinations may be read from a training database. The parameter combinations may then be used as training data for creating a decision tree for each input parameter given the input parameter sequence or any permutation thereof. The first provided parameter or input selection may not be provided by generated decision trees, since the first parameter in training and run time data may be provided by a user.

In operation 420, the generation component 140 generates a set of decision trees based on the set of training data. Identifying default values for suggestion may be understood as a classification operation or set of operations. For example, given an input of 1 . . . N−1, the trees may define a manner to find a value N. The generation component 140 generates the set of decision trees for parameter combinations for all input parameters of the set of training data. The set of training data are used as input to train the decision trees to predict next input parameters given identified permutations and combinations. In some instances, each input sequence i and its j values $v_{j;i}$ are used, as the set of training data $\{v_{1;i}, v_{2;i}, [\ldots], v_{n-1;i}, v_{n;i}\}_i$, to train the decision trees. In some embodiments, the decision trees may employ a Classification and Regression Tree (CART) algorithm. Use of the CART algorithm may enable flexibility to address classification and regression issues. The CART algorithm may provide computational efficiency in calculation and be interpretable by users. In an initial phase, the generation component 140 uses a forward step, starting with an initial node, to generate the decision trees. The generation component 140 may iteratively split nodes at specified splitting points to minimize model error.

In some embodiments, the generation component 140 uses CART models to model data in a tree data structure. Such tree structures may be binary trees with conditions in non-leaf nodes and constant values in leaf nodes. Once generated, one or more components of the present disclosure by evaluating models starting at the root (e.g., a selection or value initially supplied by the user). The condition in the model is checked and, if the condition is true, a first edge of the tree is followed. If the condition is false, a second edge of the tree is followed. Such condition-based decisions may be repeated until the component iteratively processes through the model and terminates at a leaf node.

In performing the forward step, the generation component 140 creates an initial tree with a single node. The generation component 140 may iteratively split the tree based on a splitting variable and a splitting point. The splitting point may be determined to minimize, or theoretically minimize, a residual squared error. In some instances, the generation component 140 splits a leaf until the leaf contains fewer samples than a predefined value. The generation component 140 may terminate the forward step, where a tree being generated comes to a leaf which can no longer be split. For example, where no additional options may be generated or be available.

In operation 430, the generation component 140 prunes at least a portion of a subset of decision trees of the set of decision trees. Once the generation component 140 performs the forward step and iteratively splits nodes, the generation component 140 performs pruning operations or a pruning step. During the pruning step, the generation component 140 prunes the model to decrease complexity. The generation component 140 may perform the pruning step greedily. In some instances, complexity of CART models, defined by a depth of a given decision tree, may be controlled using the input parameters. In some embodiments, based on metrics such as cross-validation error, the model parameters can be tuned using hyperparameter optimization. In some embodiments, the generation component 140 may balance the decision tree models. For example, where the training data is imbalanced, such that specific values exist more often than others, the generation component 140 may use resampling techniques. The resampling techniques may create copies or delete instances of training data values.

In some embodiments, the generation component 140 performs the pruning step to reduce tree models using cost-complexity pruning. For example, where m is the m-th leaf, $R_m$ may be a region specified by the conditions to the m-th leaf. l(T) may be a number of leaves in the tree T. For training data $\{(\vec{x_i}, y_i)\}_i$, the number of observations in a region $n_m := |\{\vec{x_i} | \vec{x_i} \in R_m\}|$. The mean of the observations values $\widehat{c_m} := n_m^{-1} \Sigma_{x_i \in R_m} y_i$. In such instances, the mean squared difference between each observed value and the mean of the observation values $q_m(T) := n_m^{-1} \Sigma_{x_i \in R_m}(y_i - \widehat{c_m})^2$. The generation component 140 may generate the cost complexity criterion with parameter α as $c_\alpha(T) := \Sigma_{m=1}^{l(T)} n_m q_m(T) + \alpha l(T)$. The parameter α may trade between complexity and fit of the training data. The generation component 140 may determine the parameter based on the residual sum of squares with cross-validation. In this manner, the generation component 140 splits the training data into partitions of model creation and model testing data. As noted above, the generation component 140 may prune the tree greedily using weakest link pruning. The generation component 140 may iteratively collapse a node with a smallest per-node increase in $\Sigma_{m=1}^{l(T)} n_m q_m(T)$.

Figure 5:
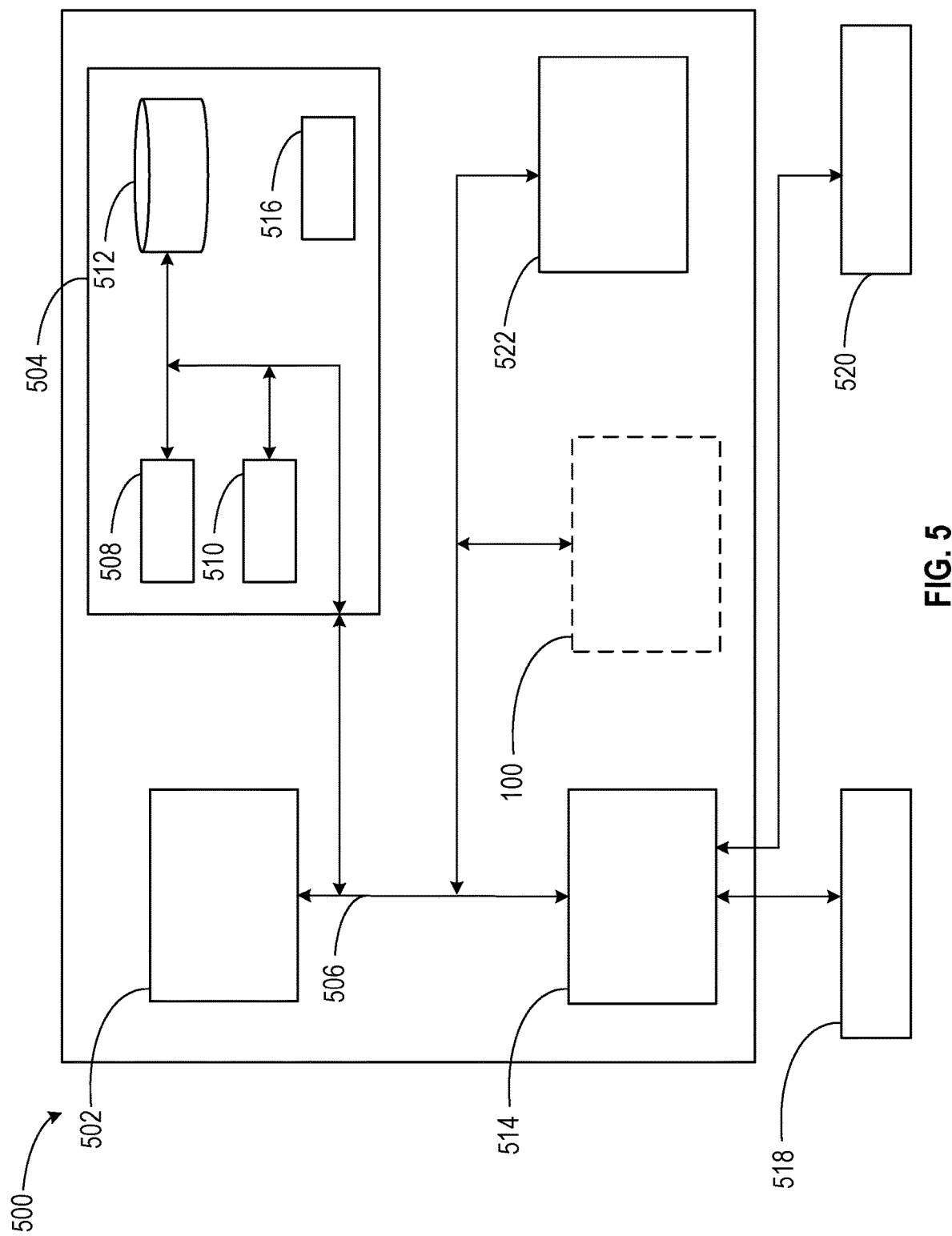
FIG. 5 depicts a block diagram of a computing system for interface enhancement, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for interface enhancement.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the interface component 110, the option component 120, the tree component 130, the generation component 140, and the presentation component 150, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Figure 6:
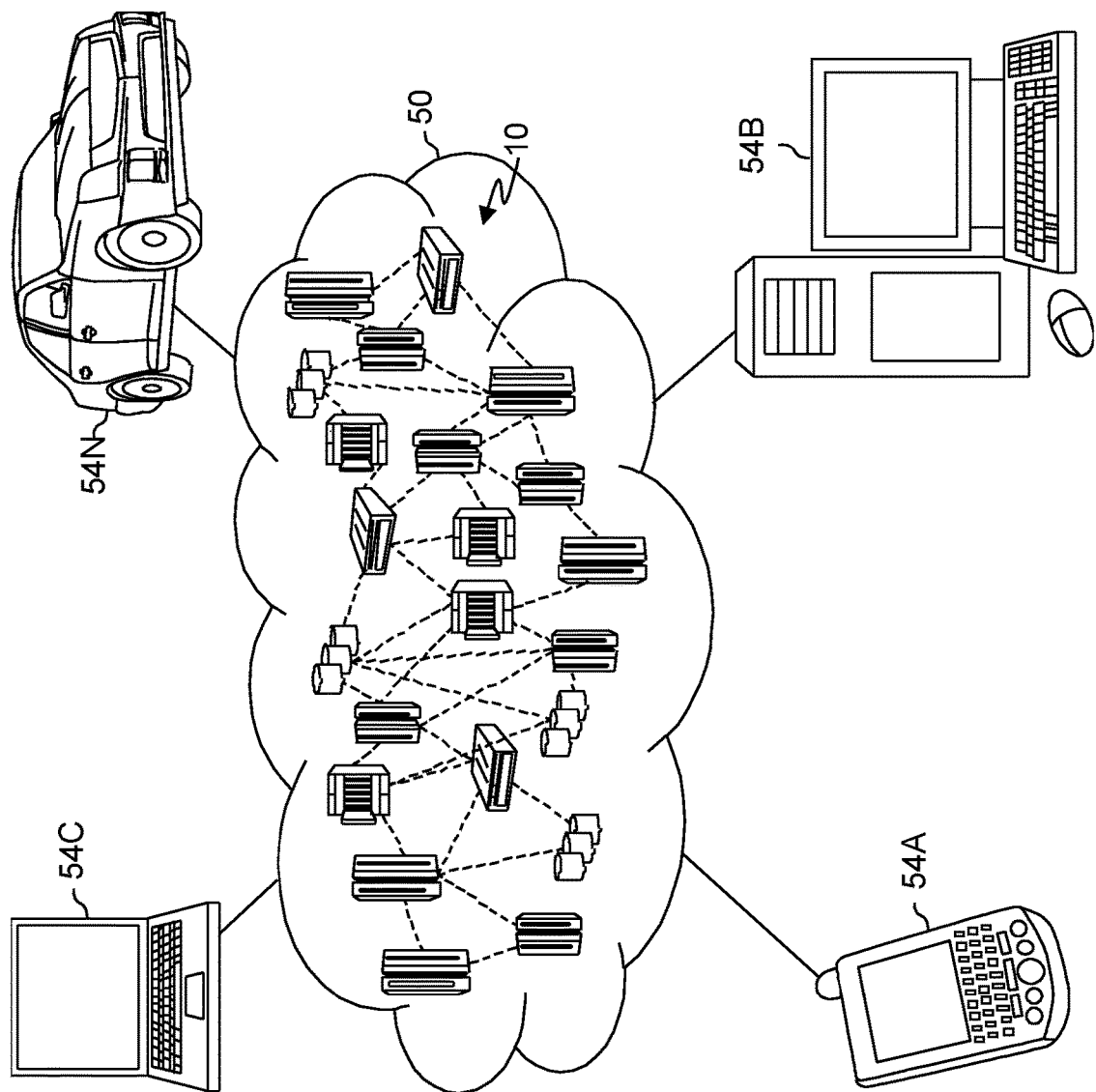
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
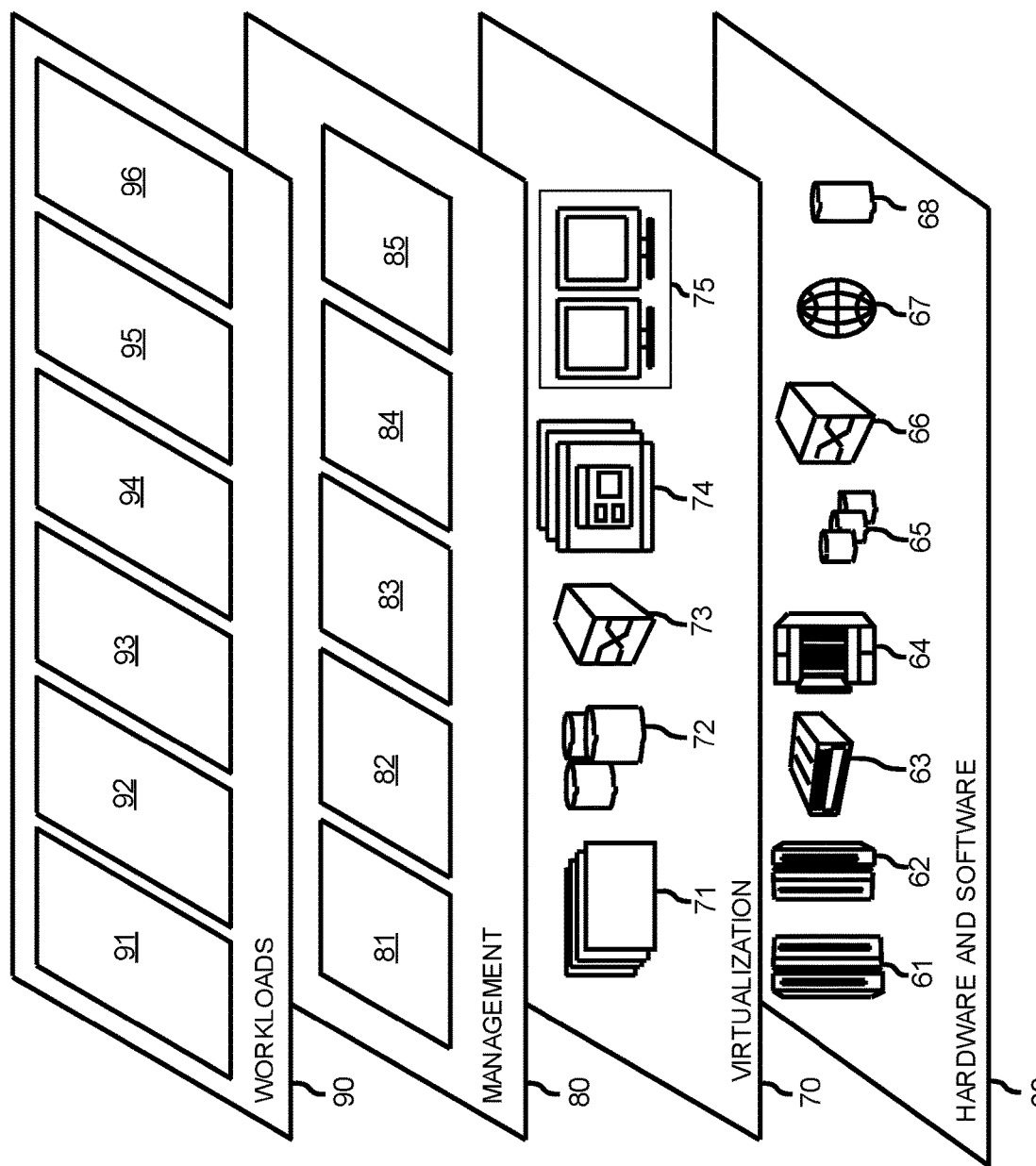
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer-readable storage medium (or media) having computer readable program instructions thereon for causing a processor to carry out aspects of the present disclosure.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

What is claimed is:

1. A computer-implemented method, comprising:
   identifying, by an interface component of an I/O configuration application, a first selection within a user interface, wherein the first selection includes a first input value for an I/O configuration;
   determining, by an option component of the I/O configuration application, a set of remaining input options based on the first selection;
   accessing, by a tree component of the I/O configuration application, a set of decision trees based on the set of remaining input options;
   selecting, by the tree component of the I/O configuration application, a decision tree of the set of decision trees based on the first input value for the I/O configuration;
   generating, by a generation component of the I/O configuration application, a suggested value for a subsequent selection for the I/O configuration by inserting the first input value for the I/O configuration into the decision tree of the set of decision trees; and
   causing, by a presentation component of the I/O configuration application, presentation of the suggested value for the subsequent selection for the I/O configuration by generating a user interface with which a user progressively interacts to generate the I/O configuration and a user interface element representing the subsequent selection for the I/O configuration.

2. The computer-implemented method of claim 1, further comprising:
   determining the first input value for the I/O configuration of the first selection is invalid; and
   causing presentation of a user interface element representing the first selection without the first input value for the I/O configuration.

3. The computer-implemented method of claim 1, further comprising:
   determining the first input value for the I/O configuration of the first selection is valid; and
   storing the first input value for the I/O configuration of the first selection within the I/O configuration.

4. The computer-implemented method of claim 1, further comprising:
   identifying the subsequent selection for the I/O configuration including a subsequent input value for the I/O configuration; and
   determining a number of remaining input options of the set of remaining input options.

5. The computer-implemented method of claim 4, wherein determining the number of remaining input options of the set of remaining input options further comprises:
   identifying the subsequent input value for the I/O configuration as a final input option of the set of remaining input options;
   storing the first input value for the I/O configuration of the first selection and the subsequent input value for the I/O configuration within the I/O configuration; and
   generating a completed I/O configuration based on the first input value for the I/O configuration of the first selection and the subsequent input value for the I/O configuration.

6. The computer-implemented method of claim 1, wherein the decision tree of the set of decision trees is a first decision tree of the set of decision trees and the suggested value for the subsequent selection for the I/O configuration is a first suggested value for a second selection for the I/O configuration, the computer-implemented method further comprising:
   identifying a second input value indicating the second selection for the I/O configuration;
   determining a subset of remaining input options from the set of remaining input options based on the second input value indicating the second selection for the I/O configuration;
   accessing the set of decision trees based on the subset of remaining input options from the set of remaining input options;
   selecting a second decision tree of the set of decision trees based on the second input value indicating the second selection for the I/O configuration, the first input value for the I/O configuration, and the subset of remaining input options from the set of remaining input options;
   generating a second suggested value for a third selection for the I/O configuration; and
   causing presentation of the second suggested value for the third selection for the I/O configuration and a user interface element representing the third selection for the I/O configuration.

7. The computer-implemented method of claim 1, further comprising:
   identifying a set of training data including a plurality of input values for a plurality of inputs for the I/O configuration;
   generating the set of decision trees based on the set of training data; and
   pruning at least a portion of a subset of decision trees of the set of decision trees.

8. A system, comprising:
   one or more processors; and
   a computer-readable storage medium, coupled to the one or more processors, storing program instructions that, when executed by the one or more processors, cause the one or more processors to perform operations comprising:
      identifying, by an interface component of an I/O configuration application, a first selection within a user interface, wherein the first selection includes a first input value for an I/O configuration;
      determining, by an option component of the I/O configuration application, a set of remaining input options based on the first selection;
      accessing, by a tree component of the I/O configuration application, a set of decision trees based on the set of remaining input options;
      selecting, by the tree component of the I/O configuration application, a decision tree of the set of decision trees based on the first input value for the I/O configuration;
      generating, by a generation component of the I/O configuration application, a suggested value for a subsequent selection for the I/O configuration by inserting the first input value for the I/O configuration into the decision tree of the set of decision trees; and
      causing, by a presentation component of the I/O configuration application, presentation of the suggested value for the subsequent selection for the I/O configuration by generating a user interface with which a user progressively interacts to generate the I/O configuration and a user interface element representing the subsequent selection for the I/O configuration.

9. The system of claim 8, wherein the operations further comprise:
   determining the first input value for the I/O configuration of the first selection is invalid; and
   causing presentation of a user interface element representing the first selection without the first input value for the I/O configuration.

10. The system of claim 8, wherein the operations further comprise:
   determining the first input value for the I/O configuration of the first selection is valid; and
   storing the first input value for the I/O configuration of the first selection within the I/O configuration.

11. The system of claim 8, wherein the operations further comprise:
   identifying the subsequent selection for the I/O configuration including a subsequent input value for the I/O configuration; and
   determining a number of remaining input options of the set of remaining input options.

12. The system of claim 11, wherein determining the number of remaining input options of the set of remaining input options further comprises:
   identifying the subsequent input value for the I/O configuration as a final input option of the set of remaining input options;
   storing the first input value for the I/O configuration of the first selection and the subsequent input value for the I/O configuration within the I/O configuration; and
   generating a completed I/O configuration based on the first input value for the I/O configuration of the first selection and the subsequent input value for the I/O configuration.

13. The system of claim 8, wherein the decision tree of the set of decision trees is a first decision tree of the set of decision trees and the suggested value for the subsequent selection for the I/O configuration is a first suggested value for a second selection for the I/O configuration, the operations further comprising:
   identifying a second input value indicating the second selection for the I/O configuration;
   determining a subset of remaining input options from the set of remaining input options based on the second input value indicating the second selection for the I/O configuration;
   accessing the set of decision trees based on the subset of remaining input options from the set of remaining input options;

selecting a second decision tree of the set of decision trees based on the second input value indicating the second selection for the I/O configuration, the first input value for the I/O configuration, and the subset of remaining input options from the set of remaining input options;

generating a second suggested value for a third selection for the I/O configuration; and causing presentation of the second suggested value for the third selection for the I/O configuration and a user interface element representing the third selection for the I/O configuration.

14. A computer program product comprising a computer-readable storage medium having program instructions embodied therewith, the program instructions being executable by one or more processors to cause the one or more processors to perform operations comprising:

identifying, by an interface component of an I/O configuration application, a first selection within a user interface, wherein the first selection includes a first input value for an I/O configuration;

determining, by an option component of the I/O configuration application, a set of remaining input options based on the first selection;

accessing, by a tree component of the I/O configuration application, a set of decision trees based on the set of remaining input options;

selecting, by the tree component of the I/O configuration application, a decision tree of the set of decision trees based on the first input value for the I/O configuration;

generating, by a generation component of the I/O configuration application, a suggested value for a subsequent selection for the I/O configuration by inserting the first input value for the I/O configuration into the decision tree of the set of decision trees; and causing, by a presentation component of the I/O configuration application, presentation of the suggested value for the subsequent selection for the I/O configuration by generating a user interface with which a user progressively interacts to generate the I/O configuration and a user interface element representing the subsequent selection for the I/O configuration.

15. The computer program product of claim 14, wherein the operations further comprise:

determining the first input value for the I/O configuration of the first selection is invalid; and causing presentation of a user interface element representing the first selection without the first input value for the I/O configuration.

16. The computer program product of claim 14, wherein the operations further comprise:

determining the first input value for the I/O configuration of the first selection is valid; and storing the first input value for the I/O configuration of the first selection within the I/O configuration.

17. The computer program product of claim 14, wherein the operations further comprise:

identifying the subsequent selection for the I/O configuration including a subsequent input value for the I/O configuration; and determining a number of remaining input options of the set of remaining input options.

18. The computer program product of claim 17, wherein determining the number of remaining input options of the set of remaining input options further comprises:

identifying the subsequent input value for the I/O configuration as a final input option of the set of remaining input options;

storing the first input value for the I/O configuration of the first selection and the subsequent input value for the I/O configuration within the I/O configuration; and generating a completed I/O configuration based on the first input value for the I/O configuration of the first selection and the subsequent input value for the I/O configuration.

19. The computer program product of claim 14, wherein the decision tree of the set of decision trees is a first decision tree of the set of decision trees and the suggested value for the subsequent selection for the I/O configuration is a first suggested value for a second selection for the I/O configuration, the operations further comprising:

identifying a second input value indicating the second selection for the I/O configuration;

determining a subset of remaining input options from the set of remaining input options based on the second input value indicating the second selection for the I/O configuration;

accessing the set of decision trees based on the subset of remaining input options from the set of remaining input options;

selecting a second decision tree of the set of decision trees based on the second input value indicating the second selection for the I/O configuration, the first input value for the I/O configuration, and the subset of remaining input options from the set of remaining input options;

generating a second suggested value for a third selection for the I/O configuration; and causing presentation of the second suggested value for the third selection for the I/O configuration and a user interface element representing the third selection for the I/O configuration.

20. The computer program product of claim 14, wherein the operations further comprise:

identifying a set of training data including a plurality of input values for a plurality of inputs for the I/O configuration;

generating the set of decision trees based on the set of training data; and pruning at least a portion of a subset of decision trees of the set of decision trees.

* * * * *